United States Patent
Puskarich et al.

(10) Patent No.: US 12,375,514 B2
(45) Date of Patent: Jul. 29, 2025

(54) IDENTIFYING CONFLICTS IN USER AUTHENTICATION

(71) Applicant: Bank of America Corporation, Charlotte, NC (US)

(72) Inventors: Petar Puskarich, Murphy, TX (US); Vijaya L. Vemireddy, Plano, TX (US)

(73) Assignee: Bank of America Corporation, Charlotte, NC (US)

( * ) Notice: Subject to any disclaimer, the term of this patent is extended or adjusted under 35 U.S.C. 154(b) by 230 days.

(21) Appl. No.: 18/209,207

(22) Filed: Jun. 13, 2023

(65) Prior Publication Data

US 2024/0422181 A1    Dec. 19, 2024

(51) Int. Cl.
  *G06F 21/00*   (2013.01)
  *G06F 21/31*   (2013.01)
  *G06F 21/36*   (2013.01)
  *H04L 9/40*    (2022.01)

(52) U.S. Cl.
  CPC .......... *H04L 63/1425* (2013.01); *G06F 21/31* (2013.01); *G06F 21/36* (2013.01); *H04L 63/0884* (2013.01)

(58) Field of Classification Search
  CPC . H04L 63/1425; H04L 63/0884; G06F 21/31; G06F 21/36
  See application file for complete search history.

(56) References Cited

U.S. PATENT DOCUMENTS

| | | | |
|---|---|---|---|
| 9,087,187 B1 | 7/2015 | Doane | |
| 11,177,937 B1 | 11/2021 | McCown et al. | |
| 11,329,998 B1 | 5/2022 | Shahidzadeh et al. | |
| 11,531,780 B2 | 12/2022 | Kundu et al. | |
| 2007/0024480 A1 | 2/2007 | Schwoerer | |
| 2008/0086759 A1 | 4/2008 | Colson | |
| 2009/0106242 A1 | 4/2009 | McGrew et al. | |
| 2010/0095371 A1* | 4/2010 | Rubin | G06F 21/36 726/18 |
| 2014/0172681 A1 | 6/2014 | Lamp et al. | |
| 2016/0086262 A1 | 3/2016 | Straub et al. | |
| 2017/0118207 A1 | 4/2017 | Madhu et al. | |

(Continued)

OTHER PUBLICATIONS

Xing, Ling, et al. "A survey of across social networks user identification." IEEE Access 7 (2019): 137472-137488. (Year: 2019).*

*Primary Examiner* — Ka Shan Choy

(74) *Attorney, Agent, or Firm* — Banner & Witcoff, Ltd.

(57) ABSTRACT

Arrangements for an identity conflict detection model are provided. In some aspects, identity information associated with the user may be received from a computing device of a user. Graph data from a graph database that integrates data from a plurality of data sources, including public and private data, into a graph visualization may be retrieved. The received identity information may be mapped to the graph data by identifying, using a graph database engine, nodes and relationship vectors associated with the user. One or more clusters of the graph data may be determined. Weights indicating a degree of importance of a corresponding relationship vector in verifying a claimed identity of the user may be applied to the identified relationship vectors. A score may be generated indicating a likelihood that the claimed identity of the user is valid, and a corresponding notification may be sent.

20 Claims, 8 Drawing Sheets

(56) References Cited

U.S. PATENT DOCUMENTS

| | | |
|---|---|---|
| 2018/0114017 A1 | 4/2018 | Leitner et al. |
| 2019/0122149 A1 | 4/2019 | Caldera et al. |
| 2019/0333100 A1* | 10/2019 | Sohum .................. G06F 21/316 |
| 2020/0053110 A1* | 2/2020 | Wan ...................... H04L 67/535 |
| 2020/0169565 A1* | 5/2020 | Badawy ................ G06F 21/552 |
| 2020/0218797 A1* | 7/2020 | Lucic ...................... G06F 21/45 |
| 2020/0293557 A1 | 9/2020 | Farrell et al. |
| 2020/0320619 A1 | 10/2020 | Motaharian et al. |
| 2020/0366671 A1 | 11/2020 | Larson et al. |
| 2021/0152543 A1 | 5/2021 | Doshi et al. |
| 2021/0241120 A1 | 8/2021 | Chen et al. |
| 2022/0114466 A1 | 4/2022 | Blumenfeld et al. |
| 2022/0158982 A1 | 5/2022 | Greene et al. |

\* cited by examiner

IDENTIFYING CONFLICTS IN USER AUTHENTICATION

BACKGROUND

Aspects of the disclosure generally relate to computer systems and networks. In particular, one or more aspects of the disclosure relate to an identity conflict detection model for determining an identity or authenticity of a user.

Unauthorized activity related to identities of users, particularly those involving synthetic identities, has gained traction. Synthetic identity schemes generally involve combining real information with fictitious information to establish a record under a new synthetic identity (e.g., using a number of different components that make up an identity) that might appear to represent a real person. New synthetic identities are constantly being created, typically in increasing sophistication and complexity. Oftentimes it may be difficult to detect and prevent unauthorized activity relating to synthetic identities.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure provide effective, efficient, scalable, and convenient technical solutions that address and overcome the technical problems associated with detecting conflicts in user identity or authentication. In accordance with one or more embodiments, a computing platform having at least one processor, a communication interface, and memory may receive, from a computing device of a user, identity information associated with the user. The computing platform may retrieve graph data from a graph database that integrates data from a plurality of data sources into a graph visualization. In addition, the graph database may include a network of nodes and relationship vectors associated with the user. In addition, the plurality of data sources may include public data from at least one publicly available data store and private data from at least one private data store. The computing platform may map the received identity information to the graph data by identifying, using a graph database engine, nodes and relationship vectors associated with the user. Based on identifying the nodes and the relationship vectors associated with the user, the computing platform may determine, using a machine learning model, one or more clusters of the graph data. The computing platform may apply weights to the identified relationship vectors. In addition, the weights may indicate a degree of importance of a corresponding relationship vector in verifying a claimed identity of the user. Based on the determined one or more clusters of the graph data and the applied weights, the computing platform may generate, using the machine learning model, a score indicating a likelihood that the claimed identity of the user is valid. The computing platform may transmit one or more notifications based on the score.

In some arrangements, the computing platform may compare the score to a predetermined threshold and, responsive to the score being less than the predetermined threshold, transmit an alert to an administrative computing device.

In some aspects, determining the one or more clusters of the graph data may include identifying a clustering anomaly of the one or more clusters using the machine learning model, and determining a presence of potential unauthorized activity based on the clustering anomaly.

In some embodiments, the identity information may include a name of a user and a unique user identifier.

In some example arrangements, identifying the one or more relationship vectors associated with the user may include transmitting a graphical representation of the one or more relationship vectors associated with the user to an administrative computing device.

In some embodiments, the identity information may include real-time monitoring and machine data of the computing device associated with the user.

In some arrangements, the public data from at least one publicly available data store may include social media data, geospatial data, web data, employment data, or the like.

In some examples, the private data from at least one private data store may include biometrics information, personally identifiable information, account information, or the like.

In some embodiments, transmitting the one or more notifications based on the score may include transmitting one or more alert messages to an administrative computing device.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

As a brief introduction to the concepts described further herein, one or more aspects of the disclosure relate to identifying potential conflicts in user identity/authentication. In particular, one or more aspects of the disclosure provide an identity conflict detection model for determining an identity or authenticity of a user. Additional aspects of the disclosure may utilize graph database technologies (e.g., graph analytics) to detect unauthorized activity. Additional aspects of the disclosure may connect diverse data sources to uncover or detect patterns that would otherwise be difficult to detect. For example, aspects of the disclosure may leverage public and private data, or internal and external data, associated with a user to identify a "stickiness" or connectedness between data points across multiple users (i.e., a strength of a relationship between nodes and/or a number of validated nodes in a graph database). Further aspects of the disclosure may execute the identity conflict detection model based on output from an unsupervised learning model, identifying clustering anomalies to determine whether the user/data should be flagged for investigation as potential unauthorized activity. These and various other arrangements will be discussed more fully below.

Figure 1A:
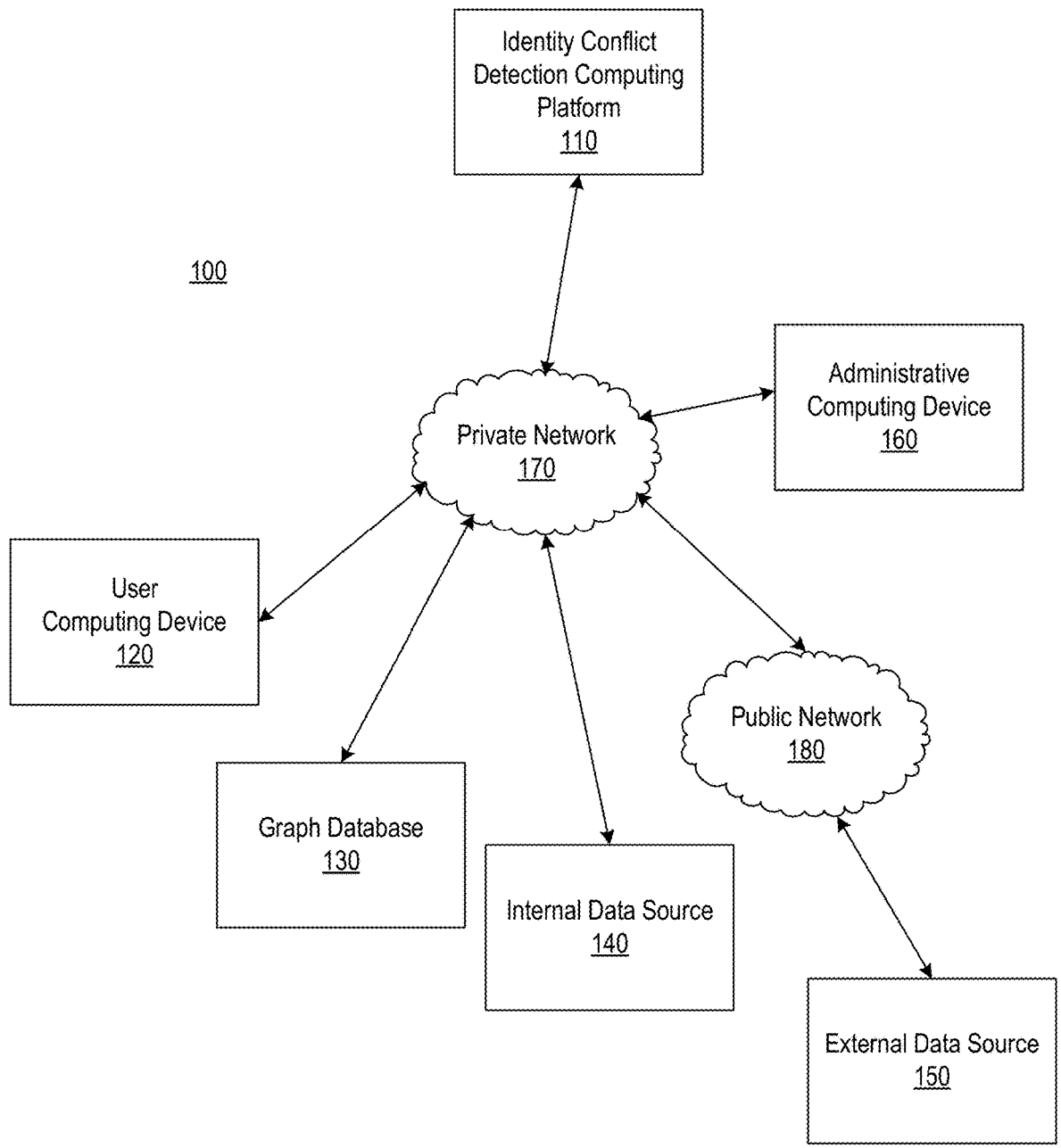
FIGS. 1A and 1B depict an illustrative computing environment for identity conflict detection in accordance with one or more arrangements discussed herein.
Figure 1B:
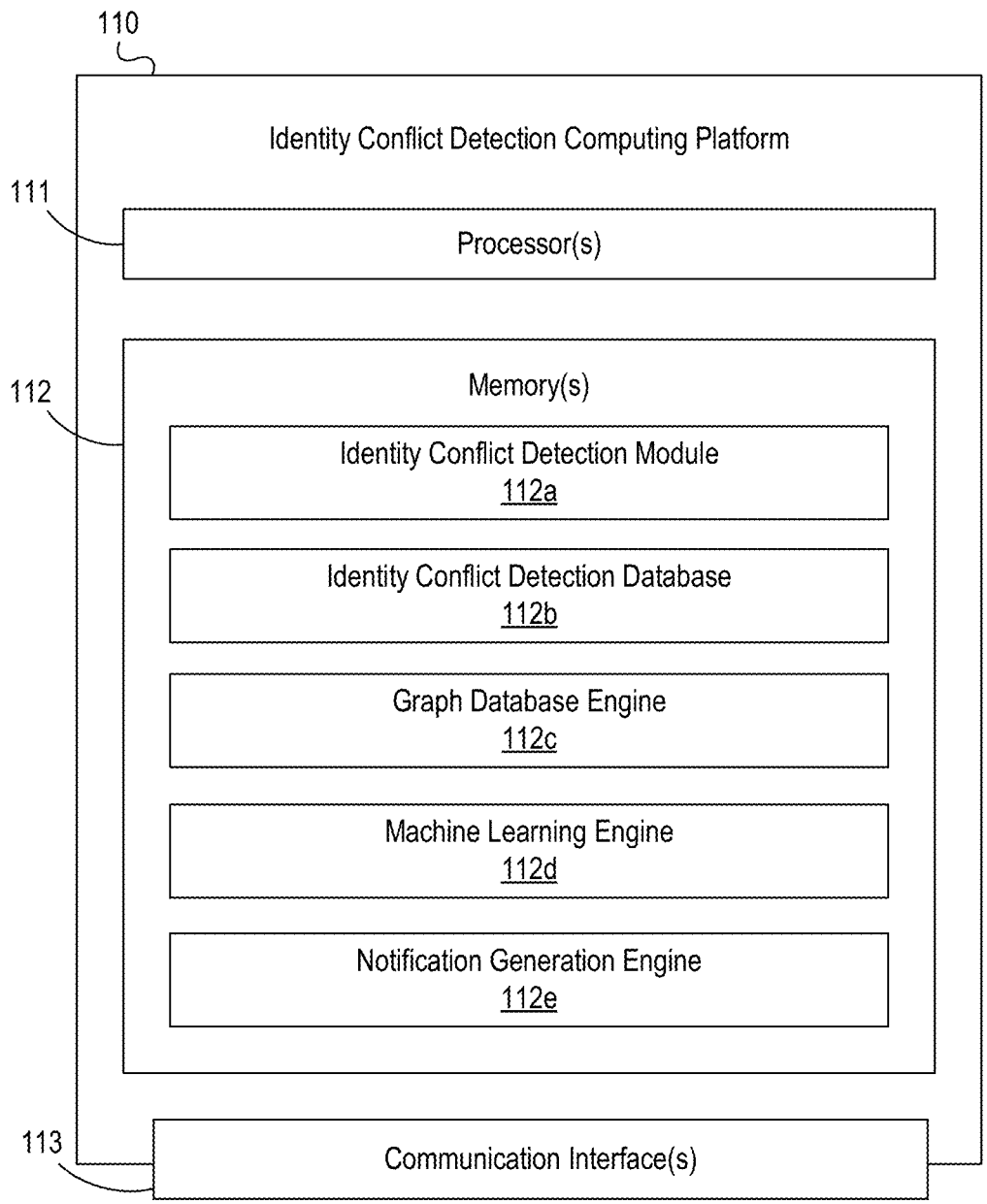

Aspects described herein may be implemented using one or more computing devices operating in a computing environment. For instance, FIGS. 1A and 1B depict an illustrative computing environment for identity conflict detection in accordance with one or more example arrangements. Referring to FIG. 1A, computing environment 100 may include one or more computing devices and/or other computing systems. For example, computing environment 100 may include identity conflict detection computing platform 110, user computing device 120, graph database 130, internal data source 140, external data source 150, and administrative computing device 160. In some examples, computing environment 100 may be a distributed computing environment such as a cloud computing environment. Although one user computing device 120, one internal data source 140, one external data source 150, and one administrative computing device 160 are shown, any number of devices or data sources may be used without departing from the disclosure.

As described further below, identity conflict detection computing platform 110 may include one or more computing devices configured to perform one or more of the functions described herein. For example, identity conflict detection computing platform 110 may include one or more computer systems, servers, server blades, or the like. In one or more instances, identity conflict detection computing platform 110 may be configured to host and/or otherwise maintain one or more machine learning models that may be used in performing identity conflict detection and/or one or more other functions described herein. Among other functions, identity conflict detection computing platform 110 leverages private (or internal) and public (or external) data to identify potential conflicts in user identity/authentication. In some instances, identity conflict detection computing platform 110 may be configured to dynamically tune machine learning models and/or algorithms as additional data is received, detected, or analyzed.

User computing device 120 may include one or more computing devices and/or other computer components (e.g., processors, memories, communication interfaces). For example, user computing device 120 may be a desktop computing device (e.g., desktop computer, terminal), or the like or a mobile computing device (e.g., smartphone, tablet, smart watch, laptop computer, or the like) used by users interacting with identity conflict detection computing platform 110.

Graph database 130 may store nodes, edges (e.g., relationship vectors) between the nodes and properties/information associated with the nodes and edges. In some examples, each node may represent a user or an entity. In some examples, each edge may represent how two nodes are linked to each other (e.g., capturing the connectedness within the data). In one or more arrangements, graph database 130 may extract insights from internal data source 140 and/or external data source 150 that may be difficult to come by with other approaches.

Internal data source 140 may be one or more computing devices (e.g., servers, server blades, or the like) that may be used to host internal user/customer data relating to an enterprise organization maintaining the internal data source 140. For example, the enterprise organization may be a financial institution, or the like, and the internal data source 140 may be configured to host biometrics information, personally identifiable information, user account information, prior interaction data (e.g., including timestamp data), or the like. In some instances, the private network 170 may include one or more internal data sources similar to internal data source 140.

External data source 150 may be one or more computing devices (e.g., servers, server blades, or the like) that may be used to host external customer data (e.g., for other enterprise organizations). For example, the external data source 150 may be configured to host social media data, geospatial/location data, web data, employment data, electronic mail data, real estate records, motor vehicle records, business or corporate registrations, or the like. In some instances, the public network 180 may include one or more external data sources similar to external data source 150.

Computing environment 100 also may include one or more networks, which may interconnect one or more of identity conflict detection computing platform 110, user computing device 120, graph database 130, internal data source 140, external data source 150, and administrative computing device 160. For example, computing environment 100 may include private network 170 and public network 180. Private network 170 and/or public network 180 may include one or more sub-networks (e.g., local area networks (LANs), wide area networks (WANs), or the like).

Private network 170 may be associated with a particular organization (e.g., a corporation, financial institution, educational institution, governmental institution, or the like) and may interconnect one or more computing devices associated with the organization. For example, identity conflict detection computing platform 110, user computing device 120, graph database 130, internal data source 140, and administrative computing device 160 may be associated with an organization (e.g., a financial institution), and private network 170 may be associated with and/or operated by the organization, and may include one or more networks (e.g., LANs, WANs, virtual private networks (VPNs), or the like) that interconnect identity conflict detection computing platform 110, user computing device 120, graph database 130, internal data source 140, administrative computing device 160 and one or more other computing devices and/or computer systems that are used by, operated by, and/or otherwise associated with the organization.

Public network 180 may connect private network 170 and/or one or more computing devices connected thereto (e.g., identity conflict detection computing platform 110, user computing device 120, graph database 130, internal data source 140, and administrative computing device 160) with one or more networks and/or computing devices that are not associated with the organization. For example, external data source 150 might not be associated with an organization that operates private network 170, and public network 180 may include one or more networks (e.g., the Internet) that connect external data source 150 to private network 170 and/or one or more computing devices connected thereto (e.g., identity conflict detection computing platform 110, user computing device 120, graph database 130, internal data source 140, and administrative computing device 160).

In one or more arrangements, identity conflict detection computing platform 110, user computing device 120, graph database 130, internal data source 140, external data source 150, and administrative computing device 160 may be any type of computing device capable of identifying potential conflicts in user identity/authentication. For example, identity conflict detection computing platform 110, user computing device 120, graph database 130, internal data source 140, external data source 150, administrative computing device 160, and/or the other systems included in computing environment 100 may, in some instances, include one or more processors, memories, communication interfaces, storage devices, and/or other components. As noted above, and as illustrated in greater detail below, any and/or all of the computing devices included in computing environment 100 may, in some instances, be special-purpose computing devices configured to perform specific functions as described herein.

Referring to FIG. 1B, identity conflict detection computing platform 110 may include one or more processors 111, memory 112, and communication interface 113. A data bus may interconnect processor(s) 111, memory 112, and communication interface 113. Communication interface 113 may be a network interface configured to support communication between identity conflict detection computing platform 110 and one or more networks (e.g., private network 170, public network 180, or the like). Memory 112 may include one or more program modules having instructions that when executed by processor(s) 111 cause identity conflict detection computing platform 110 to perform one or more functions described herein and/or one or more databases that may store and/or otherwise maintain information which may be used by such program modules and/or processor(s) 111. In some instances, the one or more program modules and/or databases may be stored by and/or maintained in different memory units of identity conflict detection computing platform 110 and/or by different computing devices that may form and/or otherwise make up identity conflict detection computing platform 110.

For example, memory 112 may have, store and/or include an identity conflict detection module 112a, an identity conflict detection database 112b, a graph database engine 112c, a machine learning engine 112d, and a notification generation engine 112e. Identity conflict detection module 112a, may have instructions that direct and/or cause identity conflict detection computing platform 110 to, for instance, leverage private (or internal) and public (or external) data to identify potential conflicts in user identity/authentication, and/or instructions that direct identity conflict detection computing platform 110 to perform other functions, as discussed in greater detail below. Identity conflict detection database 112b may store information used by identity conflict detection module 112a and/or identity conflict detection computing platform 110 in performing identity conflict detection and/or in performing other functions, as discussed in greater detail below.

Identity conflict detection computing platform 110 may further have, store and/or include a graph database engine 112c. Graph database engine 112c may store instructions and/or data that may cause or enable identity conflict detection computing platform 110 to execute graph queries and perform graph analyses.

Identity conflict detection computing platform 110 may further have, store and/or include a machine learning engine 112d. Machine learning engine 112d may use artificial intelligence/machine learning (AI/ML) algorithms to derive rules and identify clusters or patterns from private (or internal) and public (or external) data. In some examples, the AI/ML algorithm may include natural language processing (NLP), abstract syntax trees (ASTs), clustering, and/or the like. Machine learning engine 112d may have instructions that direct and/or cause identity conflict detection computing platform 110 to set, define, and/or iteratively redefine rules, techniques and/or other parameters used by identity conflict detection computing platform 110 and/or other systems in computing environment 100 in taking input from private/internal and public/external databases or data lakes and leveraging the data to identify potential conflicts in user identity/authentication (e.g., using graph technology). In some examples, identity conflict detection computing platform 110 may build and/or train one or more machine learning models. For example, memory 112 may have, store, and/or include historical/training data. In some examples, identity conflict detection computing platform 110 may receive historical and/or training data and use that data to train one or more machine learning models stored in machine learning engine 112d. The historical and/or training data may include, for instance, historical interaction data, historical transaction data, historical banking data, historical identity record data, and/or the like. The data may be gathered and used to build and train one or more machine learning models executed by machine learning engine 112d to identify one or more potential conflicts in user identity/authentication, including determining whether the user/data should be flagged for investigation (e.g., for potential anomalous or unauthorized activity), and/or perform other functions, as discussed in greater detail below. Various machine learning algorithms may be used without departing from the disclosure, such as supervised learning algorithms, unsupervised learning algorithms, abstract syntax tree algorithms, natural language processing algorithms, clustering algorithms, regression algorithms (e.g., linear regression, logistic regression, and the like), instance based algorithms (e.g., learning vector quantization, locally weighted learning, and the like), regularization algorithms (e.g., ridge regression, least-angle regression, and the like), decision tree algorithms, Bayesian algorithms, artificial neural network algorithms, and the like. Additional or alternative machine learning algorithms may be used without departing from the disclosure.

Identity conflict detection computing platform 110 may further have, store and/or include a notification generation engine 112e. Notification generation engine 112e may store instructions and/or data that may cause or enable identity conflict detection computing platform 110 to send, to another computing device (e.g., administrative computing device 160), notifications or results related to detection of potential anomalous or unauthorized activity. In some examples, if additional authentication data is requested, the notification generation module 112d may generate a notification (e.g., to user computing device 120) requesting additional authentication data.

FIGS. 2A-2D depict one example illustrative event sequence for identity conflict detection in accordance with one or more aspects described herein. The events shown in the illustrative event sequence are merely one example sequence and additional events may be added, or events may be omitted, without departing from the disclosure. Further, one or more processes discussed with respect to FIGS. 2A-2D may be performed in real-time or near real-time.

Figure 2A:
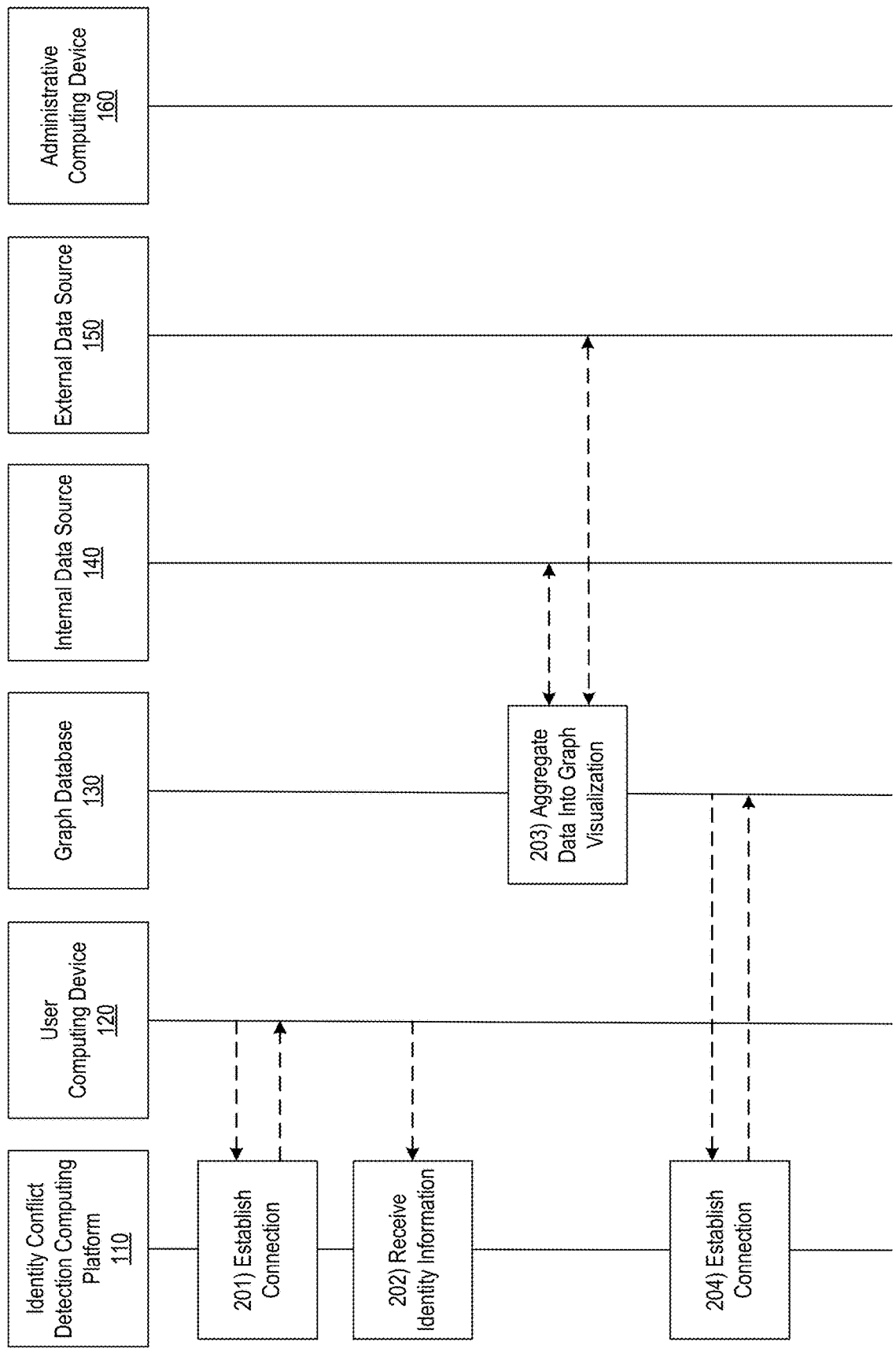
FIGS. 2A-2D depict an illustrative event sequence for identity conflict detection in accordance with one or more arrangements discussed herein.

With reference to FIG. 2A, at step 201, user computing device 120 may connect to identity conflict detection computing platform 110. For instance, a first wireless connection may be established between user computing device 120 and identity conflict detection computing platform 110. Upon establishing the first wireless connection, a communication session may be initiated between user computing device 120 and identity conflict detection computing platform 110.

At step 202, identity conflict detection computing platform 110 may receive, via the communication interface (e.g., communication interface 113), from a computing device of a user (e.g., user computing device 120), identity information associated with the user. In some examples, the identity information may include a name of a user and a unique user identifier (e.g., social security number or other personal identification number). In some examples, the identity information may include real-time monitoring and machine data of the computing device associated with the user. For instance, a malicious actor might use automated programming to open an account, and real-time monitoring and machine data collection may enable more comprehensive visibility and insight into such activities.

At step 203, graph database (e.g., graph database 130) may aggregate and integrate data from a plurality of data sources (e.g., internal data source 140, external data source 150) into a graph visualization. For example, the graph database may include a network of nodes and edges (e.g., relationship vectors) associated with the user. In some examples, the plurality of data sources may include public data (e.g., public records) from at least one publicly available data store and private data from at least one private data store. For instance, the public data may include social media data, geospatial/location data, web data, employment/human resources data, electronic mail data, real estate records, motor vehicle records, business or corporate registrations, relationship data, or the like, and the private data may include biometrics information, personally identifiable information, account information, loan or account opening documents, or the like. In some examples, the graph visualization may be a single consolidated view of all data. Advantageously, identity conflict detection computing platform 110 may be used across multiple systems for detecting a truth series.

At step 204, identity conflict detection computing platform 110 may connect to graph database 130. For instance, a second wireless connection may be established between identity conflict detection computing platform 110 and graph database 130. Upon establishing the second wireless connection, a communication session may be initiated between identity conflict detection computing platform 110 and graph database 130.

Figure 2B:
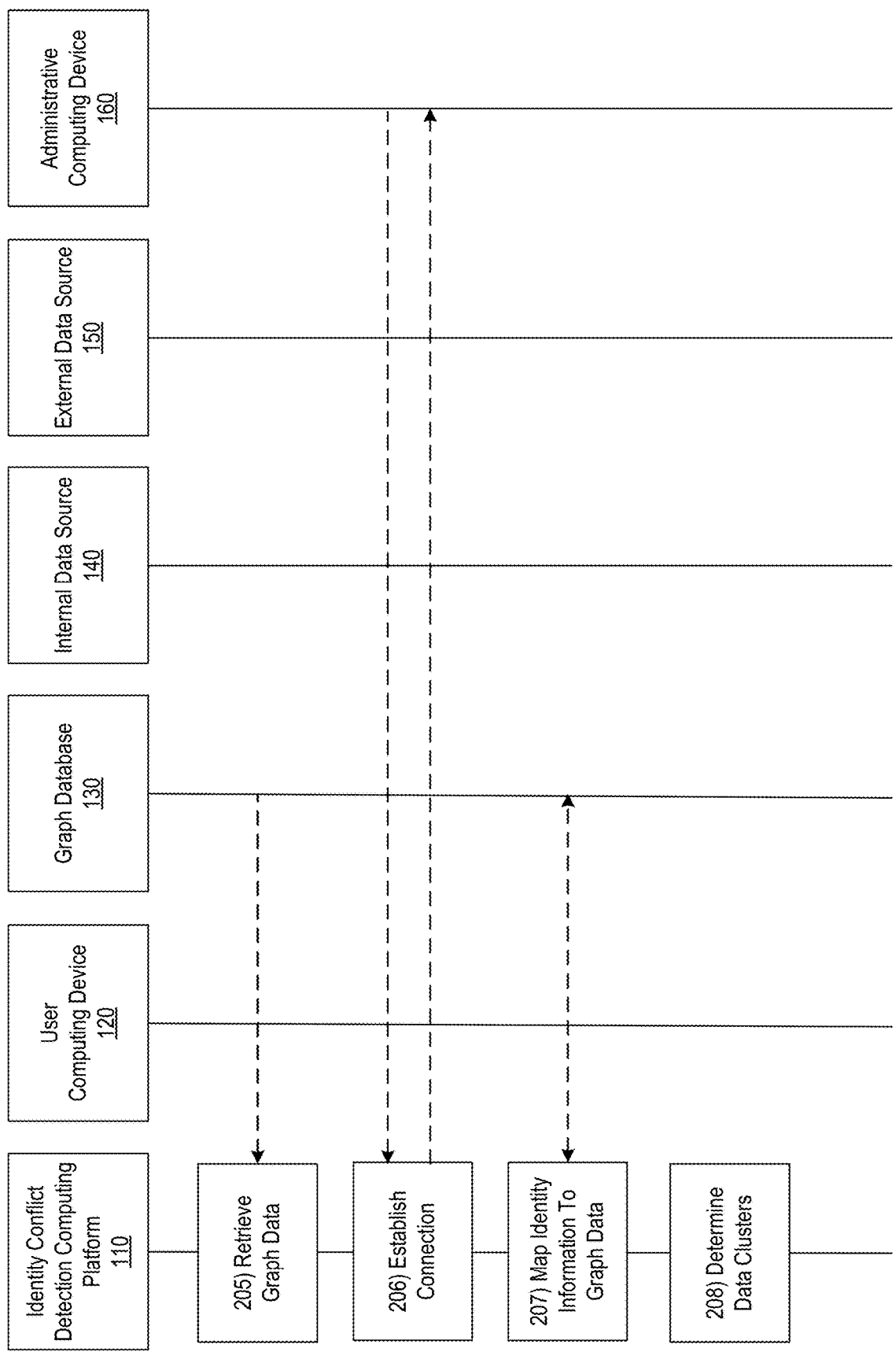

With reference to FIG. 2B, at step 205, identity conflict detection computing platform 110 may retrieve, via the communication interface (e.g., communication interface 113), graph data from the graph database (e.g., graph database 130). In some examples, the graph nodes may reference data sources and thereby pick up dynamic updates (e.g., via a data transform layer). In some examples, references in the graph data may point to data lakes.

At step 206, identity conflict detection computing platform 110 may connect to administrative computing device 160. For instance, a third wireless connection may be established between identity conflict detection computing platform 110 and administrative computing device 160. Upon establishing the third wireless connection, a communication session may be initiated between identity conflict detection computing platform 110 and administrative computing device 160.

At step 207, identity conflict detection computing platform 110 may map the received identity information to the graph data by identifying, using a graph database engine (e.g., graph database engine 112c), nodes and relationship vectors associated with the user. For instance, identity conflict detection computing platform 110 may map the received identity information to the graph data by referencing nodes of the graph database.

Figure 2C:
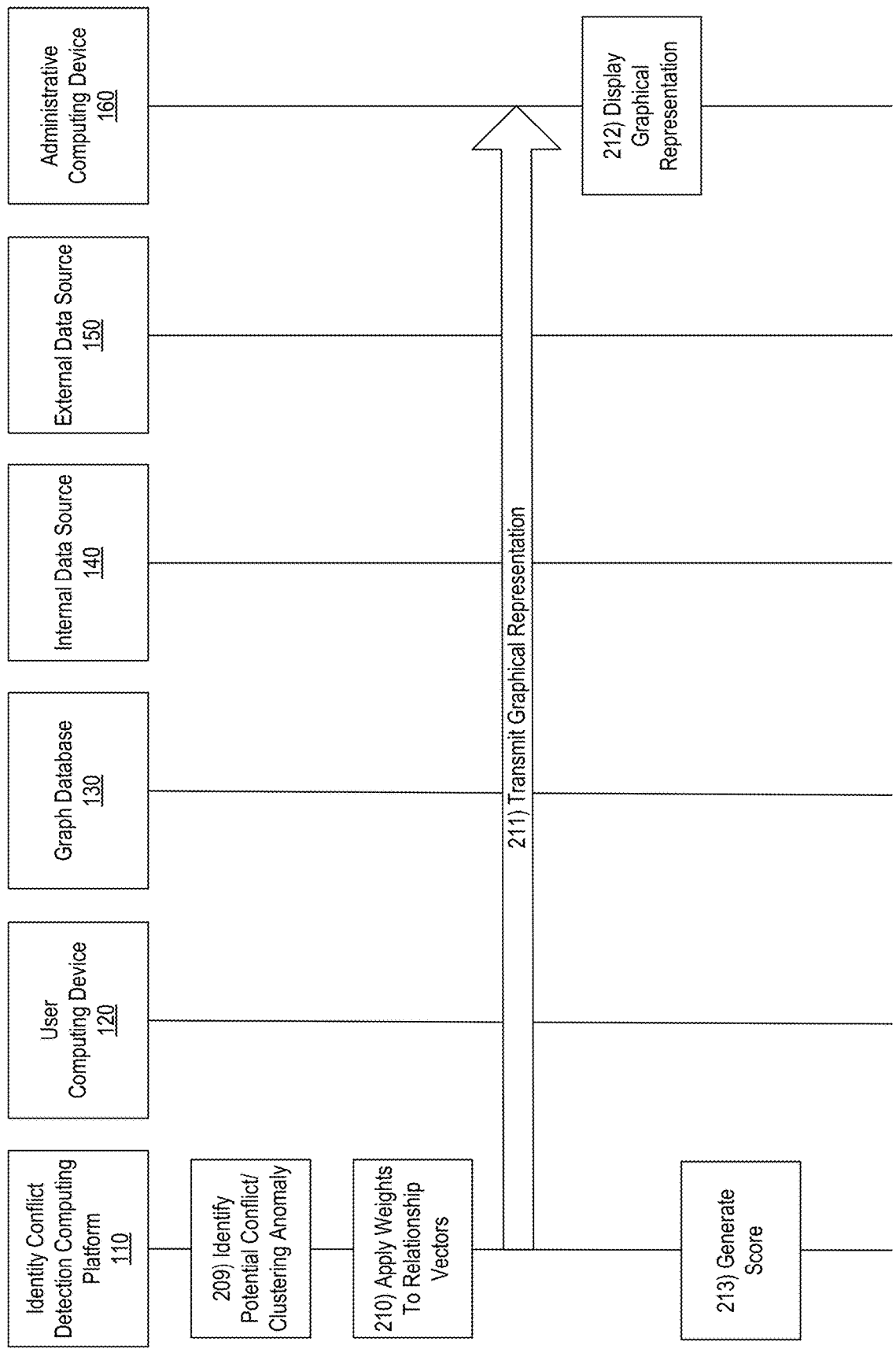

At step 208, based on identifying the nodes and the relationship vectors associated with the user, identity conflict detection computing platform 110 (e.g., via machine learning engine 112d) may determine one or more clusters of the graph data (e.g., group the graph data into one or more clusters, each containing one or more nodes) using a machine learning model. With reference to FIG. 2C, in some examples, at step 209, in determining the one or more clusters of the graph data, identity conflict detection computing platform 110 may identify a potential conflict in user identity/authentication. For instance, using the machine learning model, identity conflict detection computing platform 110 may identify a clustering anomaly of the one or more clusters, and determine, based on the clustering anomaly, a presence of potential unauthorized activity. In some examples, a threshold value may be used to identify a clustering anomaly (e.g., outlier). For instance, if a distance between a data point and its nearest centroid (e.g., center of a cluster) is greater than the threshold value, then the data point might be classified as an anomaly.

At step 210, identity conflict detection computing platform 110 may apply weights to the identified relationship vectors. In some examples, the weights may indicate a degree of importance of a corresponding relationship vector in verifying a claimed identity of the user. For instance, a node associated with an account that was opened using automated programming might be assigned a negative or heavily negative weight.

Figure 3:
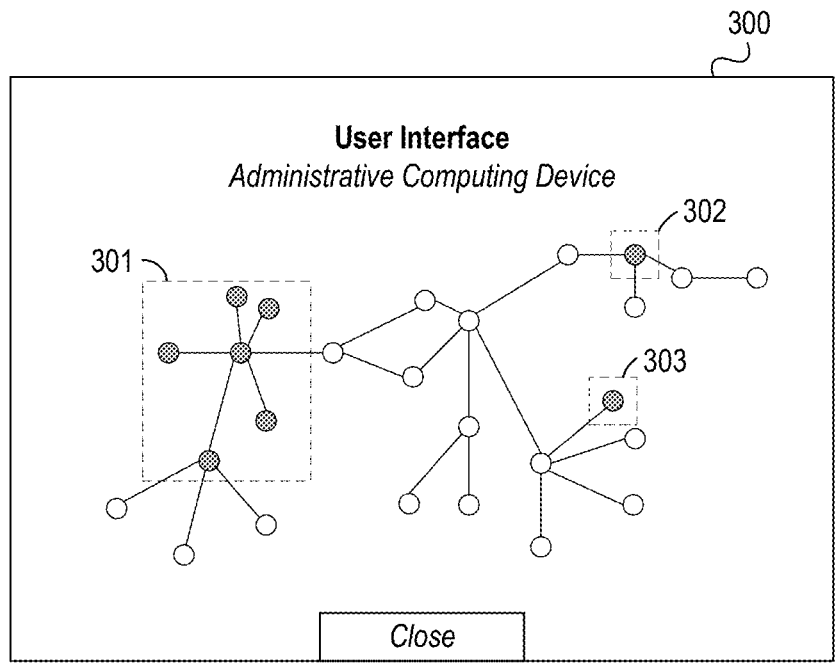
FIGS. 3 and 4 depict example graphical user interfaces for identity conflict detection in accordance with one or more arrangements discussed herein.

In some examples, at step 211, identity conflict detection computing platform 110 may transmit, to an administrative computing device (e.g., administrative computing device 160), a graphical representation of the one or more relationship vectors associated with the user. For instance, the administrative computing device (e.g., administrative computing device 160) may display and/or otherwise present one or more graphical user interfaces similar to graphical user interface 300, which is illustrated in FIG. 3. As shown in FIG. 3, graphical user interface 300 may include text and/or other information associated with a graph database visualization (e.g., where 301 is an example data cluster, and 302, 303 are examples of clustering anomalies, the nodes being farthest from a cluster center). In one example, a malicious actor might open up a bank account using a real person's name, but with different data behind it such that only some information (e.g., 301) matches up to a real person and other information (e.g., 302, 303) not matching up to the real person. Returning to FIG. 2C, at step 212, administrative computing device (e.g., administrative computing device 160) may receive and display the graphical representation. It will be appreciated that other and/or different notifications may also be provided.

At step 213, based on the determined one or more clusters of the graph data and the applied weights (e.g., based on the strength of the connections and/or the number of those connections), identity conflict detection computing platform 110 may generate, using the machine learning model, a score (e.g., a weighted score) indicating a likelihood that the claimed identity of the user is valid. For example, the score may be and/or include a truth score or a validation score indicating a probability of validating the identity of an individual (e.g., whether the individual is actually who they say they are).

Figure 2D:
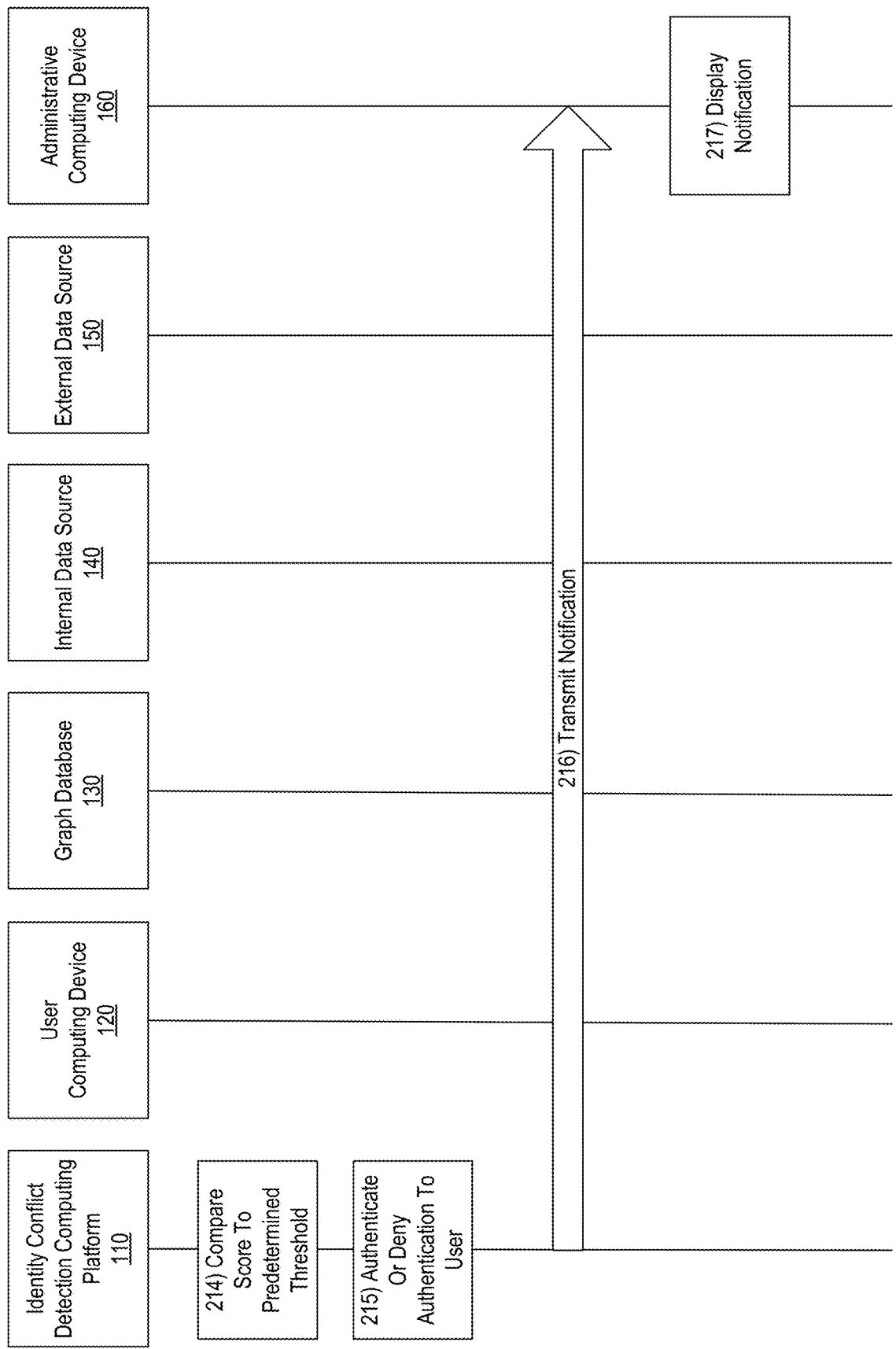

With reference to FIG. 2D, at step 214, identity conflict detection computing platform 110 may compare the score to a predetermined threshold. At step 215, identity conflict detection computing platform 110 may authenticate, or deny authentication to, the user based on the comparison. For example, responsive to the score being greater than (e.g., above) or equal to the predetermined threshold, identity conflict detection computing platform 110 may authenticate a user. Responsive to the score being less than (e.g., below) the predetermined threshold, identity conflict detection computing platform 110 may transmit an alert to an administrative computing device. In some examples, the predetermined threshold may be set by an administrative user, as a default or adjustable variable.

Figure 4:
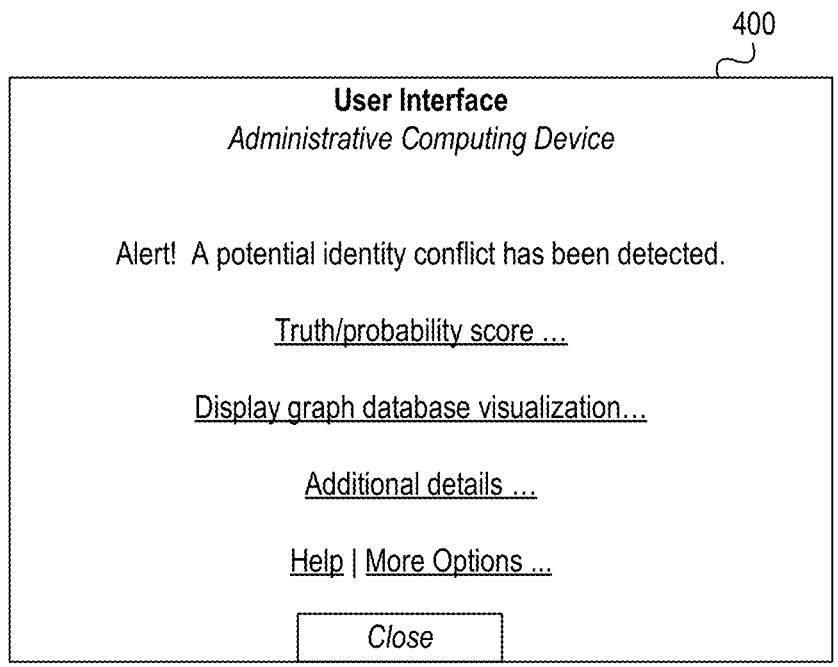

At step 216, identity conflict detection computing platform 110 may transmit (e.g., via notification generation engine 112e), via the communication interface (e.g., communication interface 113), one or more notifications or alerts (e.g., to administrative computing device 160) based on the score. For instance, the administrative computing device (e.g., administrative computing device 160) may display and/or otherwise present one or more graphical user interfaces similar to graphical user interface 400, which is illustrated in FIG. 4. As shown in FIG. 4, graphical user interface 400 may include text and/or other information associated with an alert or notification (e.g., "Alert! A potential identity conflict has been detected. [Truth/probability score . . . ] [Display graph database visualization . . . ] [Additional details . . . ]"). It will be appreciated that other and/or different notifications may also be provided. With reference to FIG. 2D, at step 217, the administrative computing device (e.g., administrative computing device 160) may receive and display the notification or alert. It will be appreciated that other and/or different notifications may also be provided.

Figure 5:
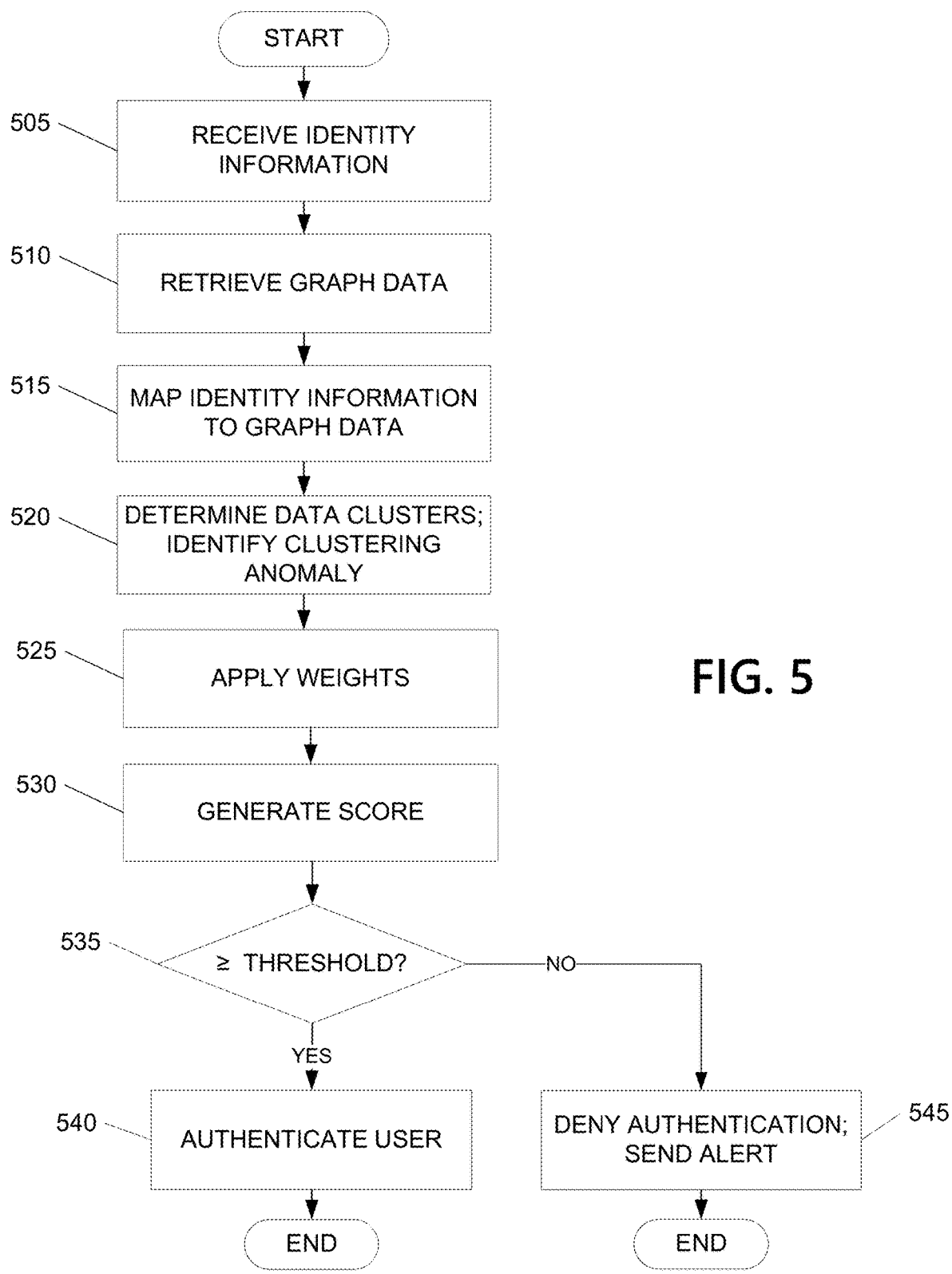
FIG. 5 depicts an illustrative method for identity conflict detection in accordance with one or more arrangements discussed herein.

FIG. 5 depicts an illustrative method for identity conflict detection in accordance with one or more example embodiments. With reference to FIG. 5, at step 505, a computing platform having at least one processor, a communication interface, and memory may receive, from a computing device of a user, identity information associated with the user. At step 510, the computing platform may retrieve graph data from a graph database that integrates data from a plurality of data sources into a graph visualization. In addition, the graph database may include a network of nodes and relationship vectors associated with the user, and the plurality of data sources may include public data from at least one publicly available data store and private data from at least one private data store. At step 515, the computing platform may map the received identity information to the graph data by identifying, using a graph database engine, nodes and relationship vectors associated with the user. At step 520, the computing platform may, based on identifying the nodes and the relationship vectors associated with the user, determine one or more clusters of the graph data using a machine learning model. In some examples, the computing platform may, identify, using the machine learning model, a clustering anomaly of the one or more clusters. At step 525, the computing platform may apply weights to the identified relationship vectors. In addition, the weights may indicate a degree of importance of a corresponding relationship vector in verifying a claimed identity of the user. At step 530, based on the determined one or more clusters of the graph data and the applied weights, the computing platform may generate, using the machine learning model, a score indicating a likelihood that the claimed identity of the user is valid. At step 535, the computing platform may compare the score to a predetermined threshold. At 540, responsive to the score being greater than (e.g., above) or equal to the predetermined threshold, the computing platform may authenticate the user. At 545, responsive to the score being less than (e.g., below) the predetermined threshold, the computing platform may deny authentication to the user and transmit an alert to an administrative computing device.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, Application-Specific Integrated Circuits (ASICs), Field Programmable Gate Arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, one or more steps described with respect to one figure may be used in combination with one or more steps described with respect to another figure, and/or one or more depicted steps may be optional in accordance with aspects of the disclosure.

What is claimed is:

1. A computing platform comprising:
   at least one processor;
   a communication interface communicatively coupled to the at least one processor; and
   memory storing computer-readable instructions that, when executed by the at least one processor, cause the computing platform to:
   receive, via the communication interface, from a computing device of a user, identity information associated with the user;
   retrieve, via the communication interface, graph data from a graph database that integrates data from a plurality of data sources into a graph visualization, wherein the graph database comprises a network of nodes and relationship vectors associated with the user, and wherein the plurality of data sources comprises public data from at least one publicly available data store and private data from at least one private data store;
   map the received identity information to the graph data by identifying, using a graph database engine, nodes and relationship vectors associated with the user;
   based on identifying the nodes and the relationship vectors associated with the user, determine, using a machine learning model, one or more clusters of the graph data;
   apply weights to the identified relationship vectors, wherein the weights indicate a degree of importance of a corresponding relationship vector in verifying a claimed identity of the user;
   based on the determined one or more clusters of the graph data and the applied weights, generate, using the machine learning model, a score indicating a likelihood that the claimed identity of the user is valid; and
   transmit, via the communication interface, one or more notifications based on the score.

2. The computing platform of claim 1, further including instructions that, when executed, cause the computing platform to:
   compare the score to a predetermined threshold; and
   responsive to the score being less than the predetermined threshold, transmit an alert to an administrative computing device.

3. The computing platform of claim 1, wherein determining the one or more clusters of the graph data comprises:
   identifying, using the machine learning model, a clustering anomaly of the one or more clusters; and
   determining, based on the clustering anomaly, a presence of potential unauthorized activity.

4. The computing platform of claim 1, wherein the identity information comprises a name of a user and a unique user identifier.

5. The computing platform of claim 1, wherein identifying the relationship vectors associated with the user comprises transmitting, to an administrative computing device, a graphical representation of the one or more relationship vectors associated with the user.

6. The computing platform of claim 1, wherein the identity information comprises real-time monitoring and machine data of the computing device associated with the user.

7. The computing platform of claim 1, wherein the public data from at least one publicly available data store comprises one or more of: social media data, geospatial data, web data, or employment data.

8. The computing platform of claim 1, wherein the private data from at least one private data store comprises one or more of: biometrics information, personally identifiable information, or account information.

9. The computing platform of claim 1, wherein transmitting the one or more notifications based on the score comprises transmitting one or more alert messages to an administrative computing device.

10. A method, comprising:
    at a computing platform comprising at least one processor, a communication interface, and memory:
    receiving, by the at least one processor, via the communication interface, from a computing device of a user, identity information associated with the user;
    retrieving, by the at least one processor, via the communication interface, graph data from a graph database that integrates data from a plurality of data sources into a graph visualization, wherein the graph database comprises a network of nodes and relationship vectors associated with the user, and wherein the plurality of data sources comprises public data from at least one publicly available data store and private data from at least one private data store;
    mapping, by the at least one processor, the received identity information to the graph data by identifying, using a graph database engine, nodes and relationship vectors associated with the user;
    based on identifying the nodes and the relationship vectors associated with the user, determining, by the at least one processor, using a machine learning model, one or more clusters of the graph data;
    applying, by the at least one processor, weights to the identified relationship vectors, wherein the weights indicate a degree of importance of a corresponding relationship vector in verifying a claimed identity of the user;
    based on the determined one or more clusters of the graph data and the applied weights, generating, by the at least one processor, using the machine learning model, a score indicating a likelihood that the claimed identity of the user is valid; and
    transmitting, by the at least one processor, via the communication interface, one or more notifications based on the score.

11. The method of claim 10, further comprising:
    comparing, by the at least one processor, the score to a predetermined threshold; and responsive to the score being less than the predetermined threshold, transmitting, by the at least one processor, an alert to an administrative computing device.

12. The method of claim 10, wherein determining the one or more clusters of the graph data comprises:
   identifying, by the at least one processor, using the machine learning model, a clustering anomaly of the one or more clusters; and
   determining, by the at least one processor, based on the clustering anomaly, a presence of potential unauthorized activity.

13. The method of claim 10, wherein the identity information comprises a name of a user and a unique user identifier.

14. The method of claim 10, wherein identifying the relationship vectors associated with the user comprises transmitting, to an administrative computing device, a graphical representation of the one or more relationship vectors associated with the user.

15. The method of claim 10, wherein the identity information comprises real-time monitoring and machine data of the computing device associated with the user.

16. The method of claim 10, wherein the public data from at least one publicly available data store comprises one or more of: social media data, geospatial data, web data, or employment data.

17. The method of claim 10, wherein the private data from at least one private data store comprises one or more of: biometrics information, personally identifiable information, or account information.

18. The method of claim 10, wherein transmitting the one or more notifications based on the score comprises transmitting one or more alert messages to an administrative computing device.

19. One or more non-transitory computer-readable media storing instructions that, when executed by a computing platform comprising at least one processor, memory, and a communication interface, cause the computing platform to:
   receive, via the communication interface, from a computing device of a user, identity information associated with the user;
   retrieve, via the communication interface, graph data from a graph database that integrates data from a plurality of data sources into a graph visualization, wherein the graph database comprises a network of nodes and relationship vectors associated with the user, and wherein the plurality of data sources comprises public data from at least one publicly available data store and private data from at least one private data store;
   map the received identity information to the graph data by identifying, using a graph database engine, nodes and relationship vectors associated with the user;
   based on identifying the nodes and the relationship vectors associated with the user, determine, using a machine learning model, one or more clusters of the graph data;
   apply weights to the identified relationship vectors, wherein the weights indicate a degree of importance of a corresponding relationship vector in verifying a claimed identity of the user;
   based on the determined one or more clusters of the graph data and the applied weights, generate, using the machine learning model, a score indicating a likelihood that the claimed identity of the user is valid; and
   transmit, via the communication interface, one or more notifications based on the score.

20. The one or more non-transitory computer-readable media of claim 19, wherein the instructions, when executed by the computing platform, further cause the computing platform to:
   compare the score to a predetermined threshold; and
   responsive to the score being less than the predetermined threshold, transmit an alert to an administrative computing device.

* * * * *